US006984147B2

(12) United States Patent
Tricaud et al.

(10) Patent No.: US 6,984,147 B2
(45) Date of Patent: Jan. 10, 2006

(54) TESTING AND CUT-OFF DEVICE FOR TELEPHONE LINE

(75) Inventors: Hervé Tricaud, Arenthon (FR); Pierre Bonvallat, Cluses (FR)

(73) Assignee: Pouyet, S.A., Rungis (FR)

( * ) Notice: Subject to any disclaimer, the term of this patent is extended or adjusted under 35 U.S.C. 154(b) by 0 days.

(21) Appl. No.: 10/281,630

(22) Filed: Oct. 28, 2002

(65) Prior Publication Data

US 2003/0049961 A1    Mar. 13, 2003

Related U.S. Application Data

(63) Continuation of application No. PCT/IB01/00656, filed on Apr. 17, 2001.

(30) Foreign Application Priority Data

Apr. 28, 2000 (FR) .................................. 00 05569

(51) Int. Cl.
*H01R 9/22* (2006.01)
(52) U.S. Cl. ...................... 439/509; 379/412; 439/922; 439/417
(58) Field of Classification Search ................ 439/509, 439/709, 417, 922; 379/412, 412.04
See application file for complete search history.

(56) References Cited

U.S. PATENT DOCUMENTS

| 2,186,813 | A | * | 1/1940 | Adam et al. ................. 337/210 |
| 4,500,158 | A |   | 2/1985 | Dola .......................... 339/122 |
| 4,562,311 | A |   | 12/1985 | Dola .......................... 179/158 |
| 4,616,897 | A |   | 10/1986 | Dola .......................... 339/122 |
| 5,074,804 | A | * | 12/1991 | Pantland et al. ............. 439/395 |
| 5,420,920 | A |   | 5/1995 | Capper et al. ............... 379/399 |
| 5,515,436 | A | * | 5/1996 | Bonvallat .................... 379/412 |
| 5,567,173 | A | * | 10/1996 | Franckx ...................... 439/418 |
| 5,641,312 | A | * | 6/1997 | Bippus et al. ................ 439/709 |
| 5,836,791 | A | * | 11/1998 | Waas et al. ................... 439/709 |
| 6,099,343 | A |   | 8/2000 | Bonvallat et al. ........... 439/412 |
| 6,188,560 | B1 | * | 2/2001 | Waas ........................... 361/119 |
| 6,196,862 | B1 | * | 3/2001 | Dooley ....................... 439/412 |

FOREIGN PATENT DOCUMENTS

| EP | 0 127 349    | 12/1984 |
| EP | 0 710 040 A1 | 5/1996  |
| EP | 0 911 907 A1 | 4/1999  |
| FR | 2 770 037    | 4/1999  |
| WO | WO 99/62270  | 12/1999 |

* cited by examiner

*Primary Examiner*—Neil Abrams
(74) *Attorney, Agent, or Firm*—James J. Trussell; John A. Burtis

(57) ABSTRACT

A testing and cut-off device for a telephone or computer line to connect two incoming strands to two outgoing strands, comprises a testing well inside which are located a first couple of terminals corresponding to the two incoming strands and a second couple of terminals corresponding to the two outgoing strands, and a pivotal cover for closing the well. These two couples of terminals are insulated from one another, when the cover is open. Each terminal is accessible from the outside by a testing plug. The device further comprises electrical contacts in the cover for interconnecting the terminals when the cover is closed. Said interconnection means in the pivotal cover also comprise means for galvanically linking the latter with an additional electrical component outside the well when the cover is closed. The additional component may be within or outside the cover. If outside it may be connected by wires joined to insulation displacement contacts attached to the cover.

12 Claims, 11 Drawing Sheets

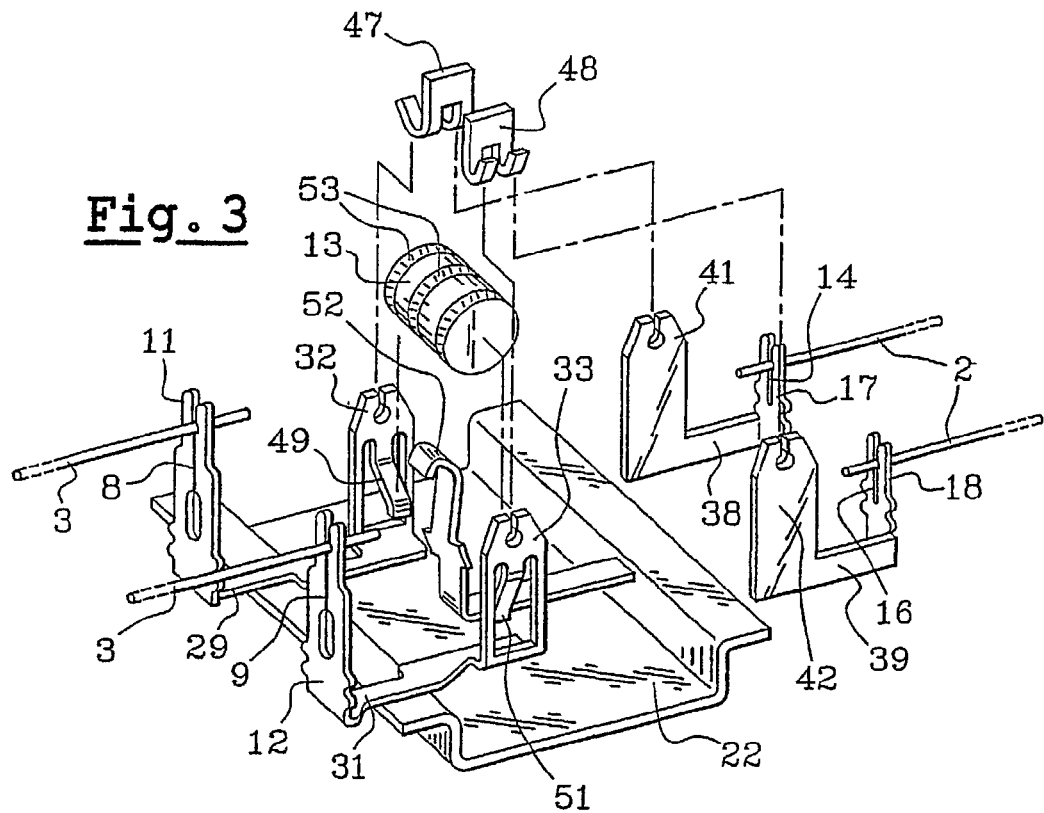
Fig. 3
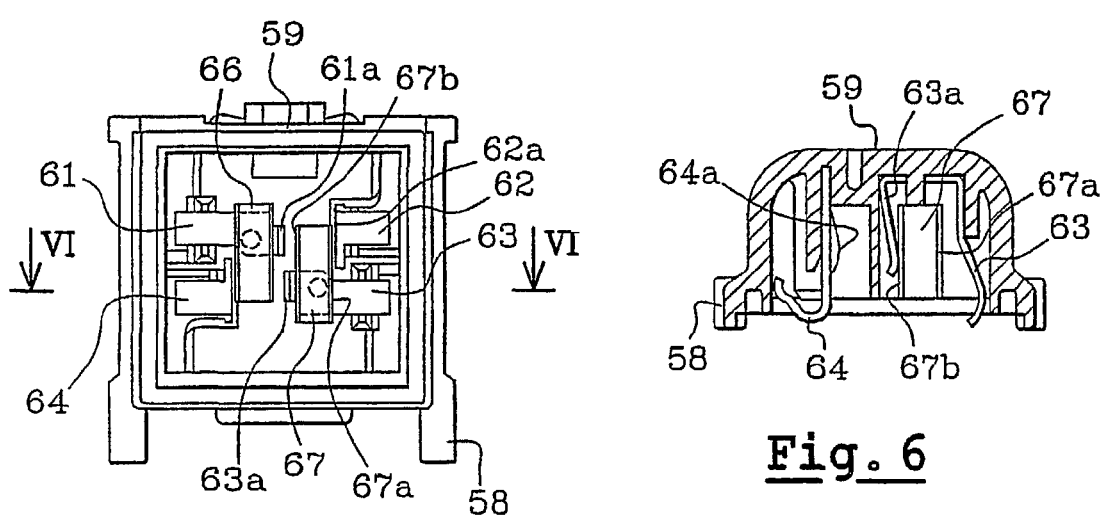
Fig. 5
Fig. 6

TESTING AND CUT-OFF DEVICE FOR TELEPHONE LINE

CROSS REFERENCE TO RELATED APPLICATIONS

This application claims priority from French patent application 00.05569, filed on Apr. 28, 2000, and International Application No.PCT/IB01/00656, filed on Apr. 17, 2001, and published in English on Nov. 8, 2001 as WO 01/84853 A1, the entire disclosures of which are incorporated herein by reference.

The present invention relates to a testing and cut-off device for telephone or computer-related line, comprising an additional electrical member.

The invention also relates to an interconnection module equipped with a testing and cut-off device for telephone or computer-related line, presenting an additional electrical member.

BACKGROUND OF THE INVENTION

In telephone exchanges and in private installations, the telephone lines are interconnected either via interconnection terminal blocks, or via interconnection modules. The general, but non-limiting, purpose of such interconnection modules and blocks is to interconnect selectively one or more lines of the telephone distribution Company, or "distributor", or incoming line(s), to one or more corresponding user lines, or "subscribers", or outgoing line(s).

The teams in charge of repairing and maintaining the lines and telephone installations make measurements or tests, selectively both on the outgoing line and on the corresponding incoming line. In addition, they sometimes make measurements or tests on these two lines, incoming line and outgoing line, when they are interconnected.

Document EP-0,710,040 discloses a line cut-off and testing device, composed of a well which contains the free ends of four metal testing blades and which is hermetically closed by a cover which ensures line continuity when it is closed, and which, on the contrary, cuts the line when it is open.

At the present time, it is necessary to be able to satisfy the subscribers' particular requirements in the most economical manner possible, and these known modules cannot be easily modified by the constructor with a view to satisfying such requirements at low cost.

SUMMARY OF THE INVENTION

The invention therefore has for an object to propose a testing and cut-off device which integrates novel functions. The invention achieves this object by providing a testing and cut-off device which may be adapted, at low cost, to the various uses or particular configurations that the consumers may require.

A testing and cut-off device, intended to be interposed on a bifilar telephone or computer-related line in order to connect two incoming strands to two outgoing strands, comprises a testing well inside which are located, on the one hand, a couple of free terminals corresponding to the two incoming strands and, on the other hand, a couple of free terminals corresponding to the two outgoing strands, and a cover for closing the well, these two couples of terminals being electrically insulated with respect to one another, when the cover is open, and each terminal then becoming selectively accessible from the outside by a respective testing plug, and means incorporating electrical contacts contained in the cover effecting the interconnection of these couples of terminals in two's when the cover is closed on the well.

According to the invention, the testing and cut-off device is characterized in that said interconnection means incorporating electrical contacts contained in the cover, also comprise at least one means for galvanically linking the latter with at least one additional electrical member placed outside the well.

Without modifying the testing and cut-off device, the novel functions are added on the already existing function of cover and line opening. This multifunctionality is obtained by one or more additional electrical members connected by one or more galvanic linking means.

According to a first possibility, the additional electrical member or members are inserted in the cover, if necessary substantially increasing the height of the cover, the latter still being able to be opened and closed for interrupting the line and/or for accessing the well.

The additional electrical member or members may be connected in series with respect to one outgoing strand, or with respect to one incoming strand, or with respect to the two incoming and outgoing strands. To that end, the means incorporating electrical contacts for interconnection of the cover are interrupted, and the additional electrical member or members are interposed at the level of this interruption of the interconnection means incorporating electrical contacts, the galvanic linking means being placed at this interruption. The additional electrical member or members may be one or more positive temperature coefficient resistors (PTCRs). One characteristic of the PTCRs is that of presenting a resistance which increases when the temperature increases: overintensities are in that case peak-clipped. PTCRs constitute protection elements for the intensity. The additional electrical member or members may be connected in parallel (in by-pass) with respect to the two strands of the bifilar line. In that case, the additional electrical members may be one or more Transil diodes which serve to peak-clip the current.

According to a second possibility, the additional electrical member or members are disposed outside the cover, this making it possible to have electrical members of larger size, for example in the form of cards or of electronic circuits.

The additional electrical member or members may be connected in series with respect to one outgoing strand, or with respect to one incoming strand, or with respect to the two incoming and outgoing strands. To that end, the interconnection means incorporating electrical contacts are interrupted and the galvanic linking means may use insulation displacement contacts, or "I.D.C.s", disposed at the level of the interruption of said interconnection means. With four insulation displacement contacts, it is possible to connect, by four electrical wires, outside the cover, inter alia, a multiline test unit (or "MTU"), while ensuring the opening of the cover. The MTU circuit makes it possible to effect a line test and to detect all defects on the line. A telephone operator will send a coded electronic signal on his line, then the MTU will, depending on this signal, return another signal then picked up by the telephone operator. Electronic components establish the continuity of the link for each of the strands within the MTU.

The additional electrical member or members may be connected in parallel with respect to the two strands of the bifilar line. With one or more galvanic linking means preferably consisting of two insulation displacement contacts, it is possible for example to connect an RC module by two electrical wires, outside the cover. The RC module allows a measurement of line impedance by sending, on it, of a determined frequency.

The cover may also comprise an additional earth contact, independent of the interconnection means, which touches a contact present in the well, the latter being directly connected to earth when the cover is closed on the well. With this type of earth contact of the cover, the additional electrical member or members may be a voltage dependent resistor ("VDR"). The resistance of a VDR decreases when the voltage at its terminals increases. The interconnection means are linked with one or more VDRs, which are themselves linked with the earth contact. In this way, the resistance of a VDR decreases when the voltage with respect to earth increases, which causes an overvoltage present on the line to run off to earth.

According to the invention, a plurality of additional electrical members may be combined by providing suitable galvanic linking means in the cover. In this way, a plurality of members may be connected together in series on one or on the two strands of line, and/or a plurality of members may be connected together in parallel on the two strands of line. Similarly, one or more members may be connected together in series simultaneously with one or more members that may be connected together in parallel. According to the invention, it is possible to combine one or more additional electrical members inserted inside the cover and one or more members disposed outside, which are connected in series and/or in parallel.

In accordance with a second aspect of the invention, a module for interconnection of two monopair telephone or computer-related lines, comprises a testing and cut-off device presenting the characteristics set forth hereinabove.

BRIEF DESCRIPTION OF THE DRAWINGS

The invention will be more readily understood and its advantages and various characteristics will be more apparent on reading the following description of a non-limiting form of embodiment, with reference to the accompanying drawings, in which:

FIG. 3 shows an exploded view in perspective of the internal connectors of this module, in accordance with the state of the art;

FIG. 5 shows a view from underneath of the cover of FIG. 4;

FIG. 6 shows a cross-section of the cover along the plane VI—VI in FIG. 5;

DESCRIPTION OF THE PREFERRED EMBODIMENTS

Figure 1:
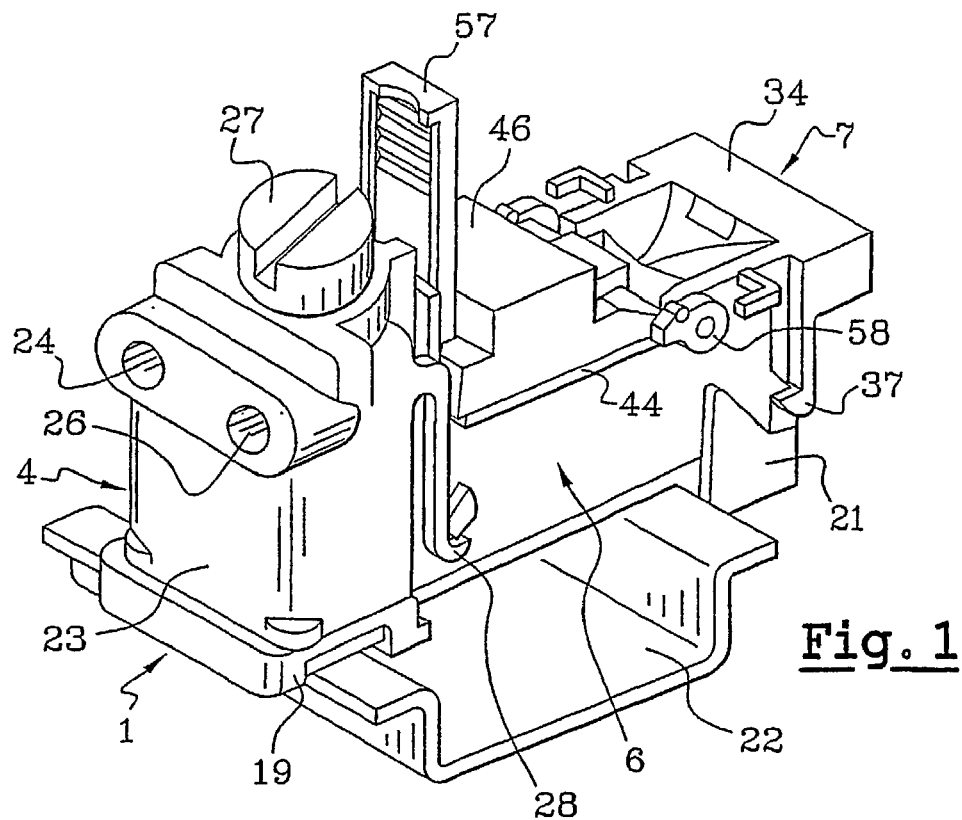
FIG. 1 shows a view in perspective of a module for interconnection of two monopair telephone lines.
Figure 2:
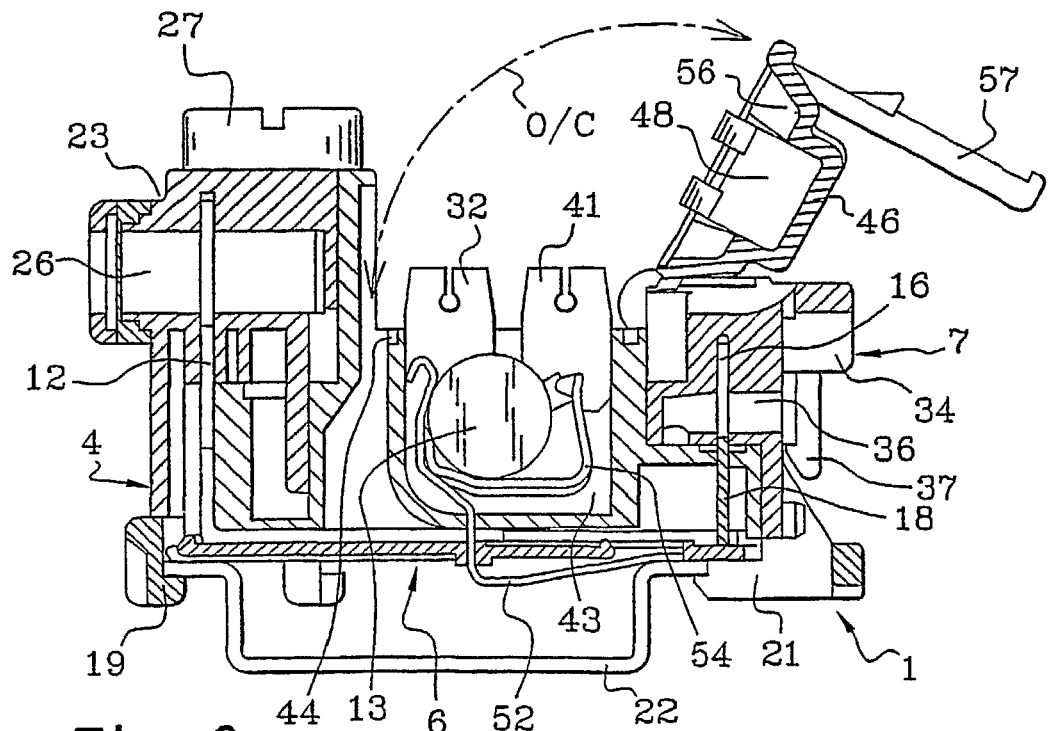
FIG. 2 shows a longitudinal section of a module for interconnection of two monopair telephone lines, in accordance with the state of the art.

Referring now to the drawings, FIGS. 1 to 3 show a module 1 for interconnection of two monopair telephone or computer-related lines which makes it possible to connect, for example, a bifilar line 2, comprising two sheathed electrical wires, called "small wires" to a bifilar line 3, comprising two sheathed electrical wires, called "large wires". Each of the small wires has a conducting core with a diameter of from 0.4 mm to about 0.8 mm, for example equal to 0.4 mm. Each of the large wires has a conducting core with a diameter of between 0.5 and 1.1 mm, for example of 0.8 mm. In the case of a distribution installation of two telephone lines on poles, the bifilar line 2 comes from the multi-line incoming cable which forms part of the telephone distribution network, while the bifilar line 3 is the outgoing line towards the subscriber. In another configuration, the large wire line 3 is composed of two overhead wires coming from the telephone distribution network, while the small wire line 2 is the outgoing line towards the subscriber's inside installation. In such a case, the large wire line 3 is the incoming line, while the small wire line 2 is the outgoing line.

This module, which is a module with so-called "tool-less" connection (i.e. without any tool other than a simple screw driver), is composed in fact, in one and the same unit, of three aligned parts 4, 6 and 7 electrically connected together, and having distinct functions. A first part 4 formes a first end of the alignment, whose function is to connect, by insertion of the two large wires 3 in two respective I.D. slots 8, 9, two I.D. contacts 11, 12 respectively. A second part 6 forms the middle of the alignment and constitutes the line cut-off and testing zone as well as the "protection" zone receiving a lightning arrester or surge arrester 13. A third part 7 forms the other end of the alignment, whose function is to connect, by insertion of the two small wires 2 in two respective I.D. slots 14, 16, two I.D. contacts 17, 18 respectively.

The parts 4, 7 for connection of the wires are therefore located on either side of the central part 6 for cut-off, testing and protection. Like all the modules of the prior art, this module 1 is provided to be fixed, by tabs 19, 21 forming slideway, on a standardized metal rail 22.

The first connection part 4 comprises an insulating pusher 23 for receiving and connecting the two large wires 3 by passage of the latter in the respective I.D. slots 8, 9 of the two I.D. contacts 11, 12. To that end, the pusher 23 comprises two blind orifices 24, 26 for receiving the two respective large wires 3, and it is equipped with a master screw 27 which traverses the base, to screw into a conventional metal nut (not shown). By screwing this screw 27, the pusher 23 is lowered, this driving the large wires 3, previously introduced in the blind orifices 24 26 inside the I.D. slots 8, 9 of the two I.D. contacts 11, 12.

The large wires 3 can be disconnected by unscrewing the screw 27 in order to lift the pusher 23. The pusher 23 presents an end-of-connection pawl 28 which not only ensures, by its end-of-stroke clicking, a firm positioning of the pusher 23, but also, by the snapping sound which results from this clicking, informs the wire fitter that the insulation displacement connection is positively made.

Each of the two I.D. contacts 11, 12 of the first connection part 4 forms part of a respective complex contact, in the form of a cut-out flat metallic circuit, which electrically connects each of them, via a longitudinal and longilinear branch 29, 31 respectively, to a testing, cut-off and receiving contact 32, 33 of the surge arrester 13. These two testing contacts 32, 33 form part of the second median part 6 of the module mentioned above.

The third connection part 7 comprises the two I.D. connection contacts 17, 18 for the small wires 2 as well as an insulating manual connection pusher 34 which is plugged on these two I.D. contacts 17, 18. The manual pusher 34 comprises two blind orifices 36 for respectively receiving each of the small wires 2. The two small wires 2 are conventionally firstly introduced in these orifices 36, the pusher 34 being lifted, then the pusher is pushed manually on the I.D. contacts 17, 18 to make it descend therealong and thus drive the two small wires 2 in their respective I.D. slots 14 and 16. The manual pusher 34 in that case remains in place and it is then possible to disconnect the wires 2 by simply lifting this pusher in order to disengage these wires from the I.D. slots 14, 16. The connection pusher 34 presents an end-of-connection pawl 37 which not only ensures, by its end-of-stroke clicking, a firm positioning of the pusher 34, but also, by the snapping sound which results from such clicking, informs the wire fitter that the insulation displacement connection is positively made.

The two I.D. contacts 17, 18 of the third part 7 form part of a respective complex contact in the form of a cut-out flat metallic circuit, which electrically connects each of them, via a longitudinal and longilinear branch 38, 39 respectively, to a testing and cutoff contact 41, 42. These two testing contacts 41, 42 form part of the second median part 6 of the module mentioned above.

The median part 6 is constituted by a well 43 of rectangular section comprising an upper O-ring 44 and closed by a pivoting cover 46. In the state of the art, the cover 46 comprises two contacts 47, 48 for line continuity, inserted longitudinally with respect to the cover. When the cover 46 is closed, the contact 47 electrically connects together the contact 32 in connection with the I.D. contact 11 for receiving one of the large wires 3, with the contact 41 in connection with the I.D. contact 17 for receiving one of the small wires 2. And when the cover 46 is closed, the contact 48 electrically connects together the contact 33 in connection with the I.D. contact 12 for receiving the other of the large wires 3, with the contact 42 in connection with the I.D. contact 18 for receiving the other of the small wires 2.

The surge arrester 13 is inserted in parallel on the bifilar large wire line 3. It is blocked between two elastic metallic parts 49, 51 advancing towards each other, belonging respectively to the contacts 32 and 33, and which bear against the two electrodes of said surge arrester 13. Moreover, the well 43 includes an earth contact 52 which bears, under the module, against the metal receiving rail 22. In the well 43, the earth contact 52 is located half way between the contacts 32 and 33 in order to be able to receive the median earth electrode 53 of the surge arrester 13. The surge arrester 13 also comprises a safety short circuit 54, also called "fail-safe", incorporating a fusible pellet.

The cover 46 comprises a hollow body 56, including the contacts 47, 48, a tab 57 for gripping and a hinge 58 ensuring its opening and closure O/C.

In a first embodiment of the invention (FIGS. 4 to 6), the known cover 46 is replaced by a cover 59 of which the hollow body is more voluminous. The interior volume of this cover 59 is intended to receive additional electrical members inserted in series between the large wire line 3 and the small wire line 2. The electrical members are two in number and, in this example, are positive temperature coefficient resistors (PTCRs). PTCRs have a parallelepipedic shape with a square face whose side measures about 5 mm and with smaller thickness equal to about 2 mm. A PTCR comprises two electrodes, one on each of the most extended opposite surfaces.

For this connection, the two known contacts 47, 48 have been replaced by four separate specific contacts 61, 62, 63 and 64. They each present a first curved end, already known, intended to bear against each of the contacts of the well 32, 33, 42 and 41 respectively. However, the shape of these contacts 61, 62, 63 and 64 has been adapted to the geometry of the two PTCRs 66 and 67. The PTCRs have been placed longitudinally inside the cover 59, one next to the other and slightly offset in the longitudinal direction, inserted between the planes defined by the contacts of the well. Consequently, one of the electrodes 66b of one of the PTCRs 66 faces an electrode 67b of the other PTCR 67, these two electrodes 66b and 67b being oriented respectively towards the centre of the cover 59. Likewise, the other of the electrodes 66a of one of the PTCRs 66 and another electrode 67a of the other PTCR 67 are oriented in opposite directions to one another and towards the lateral walls of the cover.

The contact 62, intended to touch the electrode oriented towards the lateral wall 67a of the PTCR 67, presents an additional metallic part in the form of a cut-out tongue 62a projecting towards the electrode 67a. In order to be able to touch one of the electrodes of one PTCR, which is oriented towards the centre, the corresponding contact must make a bridge and present the form of a U, in order to pass around the body of the PTCR, and it must not touch the other of the electrodes which is oriented towards the lateral wall of the cover 59. This contact is fixed to the bottom of the cover by the bottom of the U-shaped part. In this way, the contact 63, touching the opposite electrode oriented towards the centre 67b of the same PTCR 67, presents an additional portion returning towards the centre of the cover and forming the branch of the U 63a. The same applies for contact 64, with a metallic part in the form of a cut-out elastic tongue 64a, shaped to touch the electrode oriented towards the lateral wall 66a of the second PTCR 66. The same applies for contact 61, with a portion returning towards the centre 61a, and forming the branch of the U 61a, shaped to touch the other opposite electrode oriented towards the centre 66b of the second PTCR 66.

In this way, the continuity of one of the large wire strands 3 is made through the interconnection module, by the first contact of the well 32, the first contact of the cover 61, one of the electrodes of the first PTCR 66b via the branch 61a of the first contact of the cover 61, the resistive part of the first PTCR 66, the other of the electrodes 66a of the first PTCR, the cut-out metallic part 64a of the second contact 64, the second contact 64, and the second contact of the well 41, up to one of the small wire strands 2.

The continuity of the other of the large wire strands 3 is made through the interconnection module by the third contact of the well 33, the third contact of the cover 62, the cut-out metallic part 62a of the third contact 62, one of the electrodes of the second PTCR 67a, the resistive part of the second PTCR 67, the other of the electrodes 67b of the second PTCR, the branch 63a of the fourth contact of the cover 63, the fourth contact of the cover 63, and the fourth contact of the well 42, up to the other of the small wire strands 2.

In a second embodiment (FIGS. 7 to 13), the known cover 46 is replaced by a cover 68 allowing an output for connection towards an additional electrical member which is more voluminous and therefore disposed outside this cover 68. The additional electrical member is in this example an outside MTU unit (not shown). It is connected in series on each of the two line strands, to the interconnection module, by four sheathed electrical wires.

For this connection, the two known contacts 47, 48 have been replaced by four separate specific contacts 69, 71, 72 and 73. The four separate specific contacts 69, 71, 72 and 73 have been adapted and they each present a known first curved end, intended to bear against each of the contacts of the well, 32, 33, 42 and 41 respectively. They also each present another end, pointed upwardly, projecting beyond the cover 68, of the insulation displacement slot type, similar to an I.D. contact, in order to ensure connection towards the outside of the cover.

Connection is made by inserting each of the four MTU wires 74, 76, 77 and 78 respectively in the four insulation displacement slots 69a, 71a, 71a and 73a of each of the four respective I.D. contacts 69, 71, 72 and 73. The cover 68 of the well 43 comprises a manual insulating pusher 79 for receiving and connecting the four MTU wires. The cover 68 also comprises in its upper part four openings 81 82, 83 and 84 through which the ends, with I.D. slot, of the four respective I.D. contacts 69, 71, 72 and 73 emerge. The manual insulating pusher 79 comprises four transverse blind orifices 86, 87, 88 and 89 for receiving the four respective MTU wires 74, 76, 77 and 78. In this way, the four MTU wires 74, 76, 77 and 78 are firstly introduced in these orifices 86, 87 88 and 89, the pusher being lifted. Then the pusher 79 is pushed manually towards the I.D. contacts 69, 71, 72 and 73 emerging via the openings 81, 82, 83 and 84, in order to cause it to descend therealong and thus insert the four MTU wires 74, 76, 77 and 78 in their respective insulation displacement slots 69a, 71a, 72a and 73a. The manual pusher 79 remains in place, as it presents two elastic arms 90 cooperating at the end of connection with pawls 91 of the cover 68, ensuring, by their end-of-stroke clicking, a firm positioning of the manual pusher 79. A snapping sound, resulting from the clicking, informs the wire fitter that the insulation displacement connection is positively made.

Finally, it is possible to disconnect the wires 74, 76, 77 and 78, simply by lifting this pusher 79, in order to disengage them from the insulation displacement slots 69a, 71a, 72a and 73a.

Being given that the four contacts 32, 33, 41 and 42 inside the well 43 are oriented longitudinally with respect to the module, the ends of the four I.D. contacts touching them are also oriented longitudinally with respect to the module and they face the four contacts of the well. On the contrary, being given that the four outlets via the four orifices 86, 87, 88 and 89 are oriented transversely with respect to the module and are in line, the ends with insulation displacement slots 69a, 71a, 72a and 73a of the four I.D. contacts consequently being oriented transversely with respect to the module and being substantially in line, the four I.D. contacts each present intermediate right-angled bevel gears.

In a third embodiment (FIG. 14), the known cover 46 is replaced by a cover 92, allowing both an outlet for connection towards an additional electrical member outside the cover, and additional electrical members inserted inside the cover 92. The more voluminous hollow body thus receives two PTCRs 93, 94 inserted in series between the large wire line 3 and the small wire line 2.

For this connection, the two known contacts 47, 48 have been replaced by four separate specific contacts 96, 97, 98 and 99. They each present a known first curved end, intended to bear against each of the contacts of the well 32, 33, 42 and 41 respectively. The shape of these contacts has therefore been adapted, on the one hand, to the geometry of the PTCRs 93, 94 and, on the other hand, to the outlet for connection towards the outside of the cover.

The PTCRs 93, 94 have been placed longitudinally inside the cover 92 one beside the other and slightly offset in the longitudinal direction, inserted between the plans defined by the contacts of the well. Consequently, one of the electrodes 93b of one of the PTCRs 93 faces an electrode 94b of the other PTCR 94, these two electrodes 93b and 94b being respectively oriented towards the centre of the cover 92. Likewise, the other of the electrodes 93a of one of the PTCRs 93 and another electrode 94a of the other PTCR 94 are oriented in opposite directions to each other and each towards the lateral walls of the cover.

The contact 97, intended to touch the electrode oriented towards the lateral wall 94a of the PTCR 94, presents an additional metallic part in the form of a cut-out tongue 97a, projecting in the direction of the electrode 94a. In order to be able to touch one of the electrodes of a PTCR, which is oriented towards the centre, the corresponding contact must present the shape of a U, in order to pass around the body of the PTCR, and must not touch the other of the electrodes which is oriented towards the lateral wall of the cover 92. This contact is fixed to the bottom of the cover by the bottom of the U-shaped part. In this way, the contact 98, touching the opposite electrode oriented towards the centre 94b of the same PTCR 94, presents an additional portion returning towards the centre of the cover and forming the branch of the U 98a. The same applies to the contact 99, with an elastic metallic part in the form of cut-out tongue 99a, shaped to touch the electrode oriented towards the outside 93a of the second PTCR 93. And the same applies to contact 96, with a portion returning towards the centre, and forming the branch of the U 96a, shaped to touch the other opposite electrode oriented towards the centre 93b of the second PTCR 93.

The additional electrical member outside the cover 92 is, in this example, an RC module (not shown). It is connected in parallel, bridging one of the line strands to the other line strand, to the interconnection module by two sheathed electrical wires (not shown). For this connection, two contacts 96, 97 of the cover 92 among the four in most direct electrical connection with the large wires 3, also present another end, pointed upwardly, projecting from the cover 92, of the type incorporating an insulation displacement slot, similar to an I.D. contact, in order to ensure the connection towards the outside of the cover. Connection is made by inserting each of the two wires of the RC module respectively in the two insulation displacement slots 96b and 97b of each of the two respective I.D. contacts 96 and 97. The cover 92 of the well 43 comprises a manual insulating pusher 101 for receiving and connecting the two wires of the RC circuit. The cover 92 also comprises in its upper part two openings 102 and 103 through which the ends, with insulation displacement slot, of the two respective I.D. contacts 96 and 97 emerge. The manual insulating pusher 101 comprises two transverse blind orifices 104, 106 for receiving the two respective wires of the RC circuit.

The two wires of the RC circuit are thus firstly introduced in these orifices 104, 106, the pusher 101 being lifted. The pusher 101 is then pushed manually towards the I.D. contacts 96 and 97 emerging via openings 102 and 103, in order to cause it to descend therealong and thus drive the two wires of the RC circuit into their respective insulating displacement slots 96b, 97b. The manual pusher 101 remains in place, as it presents two elastic arms 90 cooperating at end of connection with pawls 91 of the cover 92, ensuring by their end-of-stroke clicking a firm positioning of the manual pusher 101. A snapping sound resulting from the clicking informs the wire fitter that the insulation displacement connection is positively made. Finally, it is possible to disconnect the wires simply by lifting this pusher 101, in order to disenage them from the insulation displacement slots 96B, 97b.

Being given that the four contacts 32, 33, 41 and 42 inside the well 43 are oriented longitudinally with respect to the module, the ends of the four I.D. contacts touching them are also oriented longitudinally with respect to the module, and they face the four contacts of the well. On the contrary, being given that the two outlets via the two orifices 104 and 106 are oriented transversely with respect to the module and are in line, the ends with insulation displacement slots 96b and 97b of the two I.D. contacts consequently being oriented transversely with respect to the module and being substantially in line, the two I.D. contacts each present intermediate right-angled bevel gears.

In a fourth embodiment (FIG. 15), the known cover 46 is replaced by a cover 107, allowing both an outlet for connection towards an additional electrical member outside the cover, and additional electrical members inserted inside the cover 107. The more voluminous hollow body thus receives two PTCRs 108, 109 inserted in series between the large wire line 3 and the small wire line 2.

For this connection, the two known contacts 47, 48 have been replaced by four separate specific contacts 111, 112, 113, 114. They each present a known first curved end intended to bear against each of the contacts of the well, 32, 33, 42, 41 respectively.

The shape of these contacts has therefore been adapted, on the one hand, to the geometry of the PTCRs 108, 109 and, on the other hand, to the outlet for connection towards the outside of the cover.

The PTCRs 108 and 109 have been placed inside the cover 107 in manner similar to the first and third embodiments described hereinabove. Consequently, the four contacts of the cover 111, 112, 113 and 114 present the same shape adapted to the PTCRs as the contacts of the cover of said first and third embodiments.

The additional electrical member outside the cover 107 is in this embodiment a module (not shown) connected in series on each of the two line strands 2 and 3 by four sheathed electrical wires (not shown). The four contacts of the cover 111, 112, 113 and 114 likewise each present another end, pointed upwardly, projecting beyond the cover 107, of the type with insulation displacement slot 111a, 112a, 113a, 114a similar to an I.D. contact in order to ensure the connection towards the outside of the cover. The insulation displacement slot ends are disposed at right angles with respect to the ends touching the contacts of the well, hence the necessary presence, for each, of the intermediate bevel gear. Similarly to the second embodiment previously described, the cover 107 comprises an insulating manual pusher 113 with four transverse blind orifices 114, 116, 117 and 118. In the cover 107 itself there are arranged four openings 119, 121, 122 and 123 intended for the passage and outlet of the four ends with insulation displacement slot 111a, 112a, 113a and 114a respectively. The connection of the four electrical wires of the module is made in a manner equivalent to the processes described in the second and third embodiments mentioned above.

In a fifth embodiment (FIGS. 16 to 19), the known cover 46 is replaced by a cover 124, whose hollow body is more voluminous. The interior volume of this cover 124 is intended to receive an additional electrical member inserted in parallel, bridging one of the line strands to the other line strand. The electrical member is in this example a Transil diode 126. The Transil is tubular in shape, about 6 mm long and with a diameter of 3 mm. The Transil comprises at each end an electrode in the form of an electrical wire 126a, 126b.

For this connection, the two known contacts 47, 48 have been replaced by two specific contacts 127 and 128. They each present a first and a second curved end 127a and 128a, which are already known, intended to bear against each of the contacts of the well, 32, 41 and 33, 42 respectively. However, the shape of these specific contacts 127, 128 has been adapted to the geometry of the Transil 126. The Transil has been placed on the longitudinal axis, horizontally, inside the cover 124, inserted between the planes defined by the contacts of the well. Consequently, one of the electrodes 126a of the Transil is oriented towards the hinge 58 and the other of the electrodes 126b of the Transil is oriented towards the tab 57 for gripping.

One of the contacts 127, intended to touch the electrode oriented towards the hinge 126a, presents a protuberance 127b deployed perpendicularly to the contact, i.e. transversely with respect to the cover 124, and in the direction of the other contact 128.

In the protuberance 127b, there is made a downwardly open slot 127c receiving, by insertion then blocking, the wire of the electrode 126a of the Transil. Opposite, the other contact 128, intended to touch the electrode oriented towards the tab 126b for gripping, presents a protuberance 128b, deployed perpendicularly to the contact, i.e. transversely with respect to the cover 124 and in the direction of the first contact 127. In the protuberance 128b, there is made a downwardly open slot receiving, by insertion then blockage, the wire of the electrode 126b of the Transil.

The connection is therefore made from the contacts 32, 41 of the well towards the contacts 33, 42 of the well, via the contact 127 with its protuberance 127b, the Transil 126, and the contact 128 with its protuberance 128b.

In a sixth embodiment (FIGS. 20 to 23), the known cover 46 is replaced by a cover 129 whose hollow body is more voluminous. The interior volume of this cover 129 is intended to receive additional electrical members inserted in parallel, bridging one of the line strands to the other line strand. The electrical members are, in this embodiment, two VDRs. A VDR has the shape of a pellet with a diameter of about 6 mm and 2.5 mm thick. A VDR comprises two electrodes, one on each of the opposite round faces.

For this connection, the two known contacts 47, 48 have been replaced by two specific contacts 131, 132. They each present a first and a second curved end 131a, 132a, which is already known, intended to bear against each of the contacts of the well 32, 41 and 33, 42, respectively. The shape of these specific contacts 131, 132 has been adapted to the geometry of the VDRs. The two VDRs 133, 134 have been placed longitudinally inside the cover 129, one beside the other and edgewise between the planes defined by the contacts of the well.

The contact 131, intended to touch one of the electrodes of the VDR 133, presents an additional metallic part in the form of a cut-out tongue 131b projecting in the direction of the electrode. The same applies for the contact 132 intended to touch one of the electrodes of the VDR 134 with the aid of its cut-out tongue 132b.

Between the two VDRs 133, 134 and parallel thereto, an earth contact 136 has been inserted, in the form of a metal plate provided with some points coming into contact with the electrodes of the two VDRs. This earth contact 136, on the one hand, is fixed in the mass of the cover, and on the other hand, opposite, it comprises a tab 136a deployed in the well when the cover is closed. The tab 136a is oriented substantially perpendicularly with respect to the plane defined by the plate of the earth contact 136. When the cover 129 pivots and closes, the tab 136a descends and touches the earth contact 52 of the well, itself in contact with the median earth electrode 53 of the surge arrester 13, and in abutment against the metal reception rail 22 of the interconnection device (cf. FIG. 3).

The connection is therefore made from the contacts 32, 41 of the well towards the earth contact 52 of the well, via the contact of the cover 131 with its tongue 131b, the first VDR 133, and the central earth contact 136 with its tab 136a. In the same way, the connection is made from the contacts 33, 42 of the well towards the earth contact 52 of the well, via the contact of the cover 132 with its tongue 132b, the second VDR 134 and the central earth contact 136 with its tab 136a.

The present invention is not limited to the embodiments which have just been described and other adaptations of this module and its cover may in particular be envisaged. For example, the additional electrical members inserted in the cover may be of any type, any shape or any dimensions, on condition that the cover can always be opened. They may be connected in series or in parallel. For example, the additional electrical members outside the cover may be connected together in series or in parallel by other means. There may be two or four tuning fork contacts accessible from the outside by a plug-in electrical member, in the same way, for example, as the plug-in module 22 for continuity and protection is connected on an interconnection module in accordance with the document U.S. Pat. No. 5,515,436, according to FIGS. 2, 3 and 6 thereof.

What is claimed is:

1. Testing and cut-off device, for interposing on a bifilar telephone or computer-related line in order to connect two incoming strands to two outgoing strands, said device comprising:
a testing well inside which are located a first couple of free terminals corresponding to the two incoming strands, a second couple of free terminals corresponding to the two outgoing strands, and a first electrical member comprising a surge arrestor connected to certain ones of the free terminals, and
a cover for closing the well,
wherein said first coupled and said second couple are electrically insulated with respect to one another when the cover is open and each terminal being selectively accessible from the outside by a respective testing plug when the cover is open, and said device comprising means incorporating electrical contacts contained in the cover for effecting the interconnection of said first coupled and said second coupled when the cover is closed on the well,
wherein said interconnection means incorporating electrical contacts contained in the cover comprise at least one means for galvanically linking said first couple and said second couple with at least one additional component-type electrical member retained inside the cover.

2. Device according to claim 1 wherein the at least one additional electrical member is connected in series with respect to one of the outgoing strands.

3. Device according to claim 2, wherein the interconnection means incorporating electrical contacts are interrupted, and the galvanic linking means are placed at the interruption of said interconnection means with electrical contacts.

4. Device according to claim 2 wherein the at least one additional electrical member comprises a positive temperature coefficient resistor.

5. Device according to claim 1 wherein the galvanic linking means are selected from: projections forming tabs, insulation displacement contact, and slot contacts.

6. Module for interconnection of two monopair telephone or computer-related lines, said module comprising the testing and cut-off device according to claim 1.

7. Device according to claim 1 wherein the at least one additional electrical member or members are connected in series with respect to one of the outgoing strands.

8. Device according to claim 1 wherein the at least one additional electrical member is connected in series with respect to one of the outgoing strands.

9. Device according to claim 1 wherein the at least one additional electrical member is connected in series with respect to the two outgoing and incoming strands.

10. Device according to claim 1 wherein the at least one additional electrical member is connected in series with respect to one of the incoming strands.

11. Device according to claim 1 wherein the at least one additional electrical member is connected in series with respect to the two outgoing and incoming strands.

12. Device according to claim 4 wherein the at least one additional electrical member comprises is an MTU module.

* * * * *

UNITED STATES PATENT AND TRADEMARK OFFICE
CERTIFICATE OF CORRECTION

Figure 4:
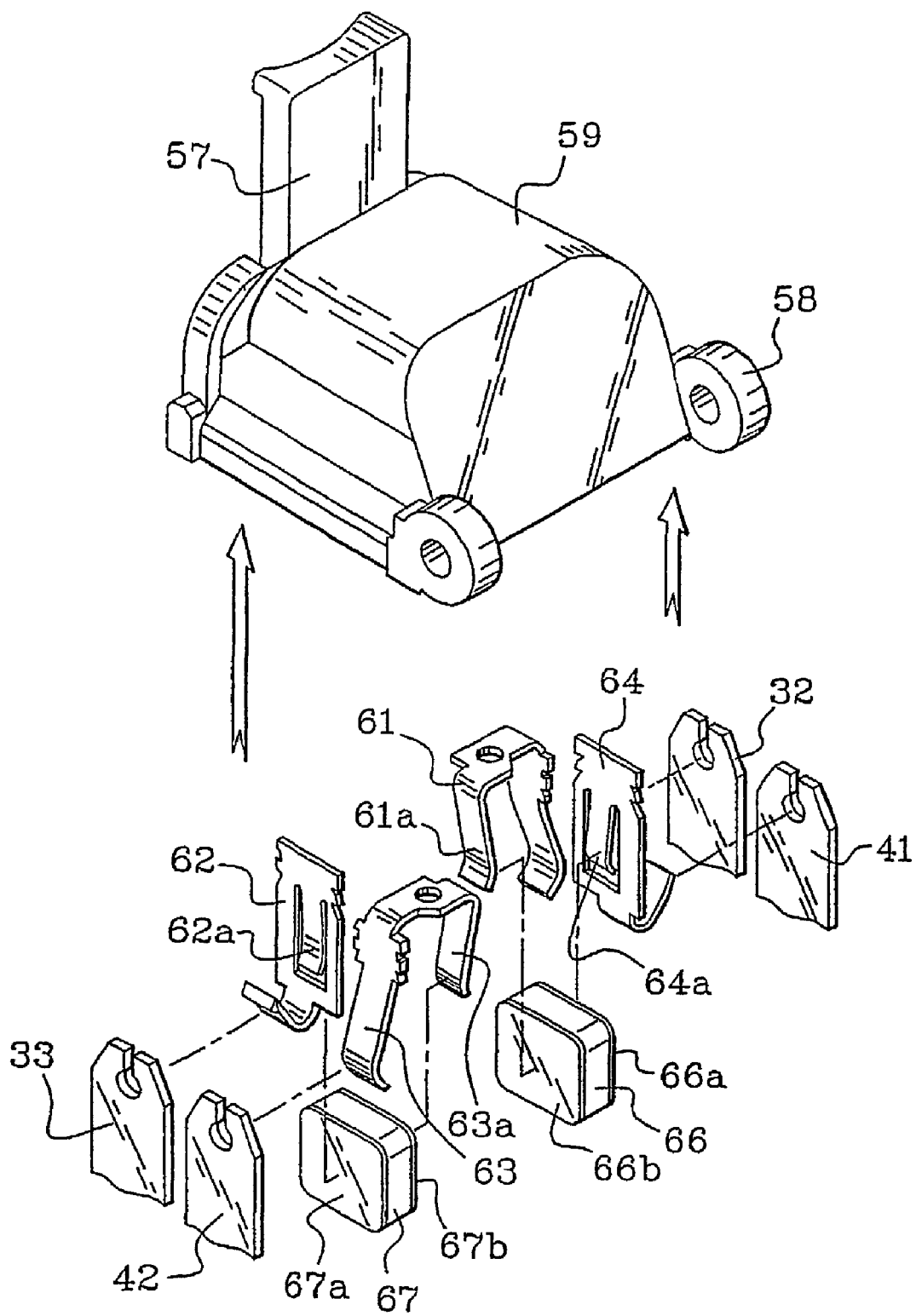
FIG. 4 shows in exploded perspective view a cover, its contacts and its additional electrical members, according to a first embodiment of the invention.

PATENT NO. : 6,984,147 B2  Page 1 of 7
APPLICATION NO. : 10/281630
DATED : January 10, 2006
INVENTOR(S) : Herve Tricaud It is certified that error appears in the above-identified patent and that said Letters Patent is hereby corrected as shown below:

Drawing
Sheet 3/11, Fig. 4

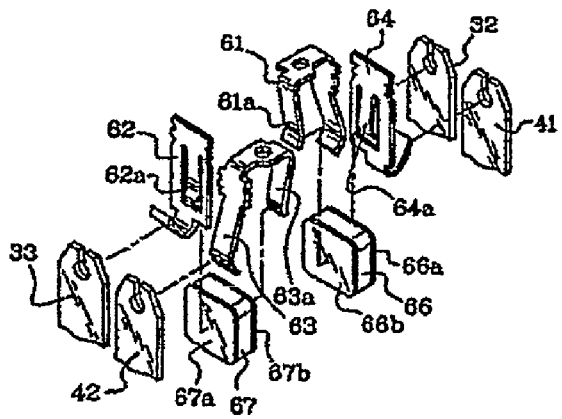

Delete "                                              " and

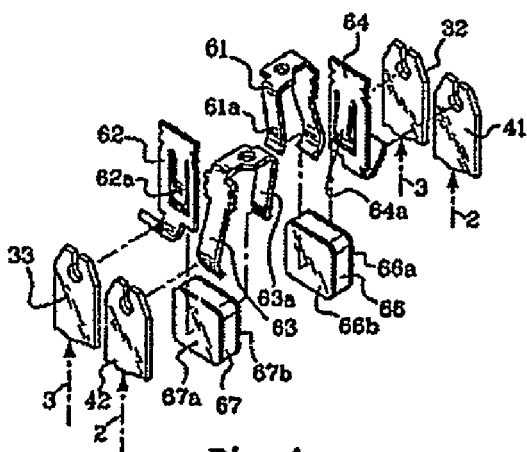

insert --                                              --, therefor.

UNITED STATES PATENT AND TRADEMARK OFFICE
CERTIFICATE OF CORRECTION

PATENT NO. : 6,984,147 B2  
APPLICATION NO. : 10/281630  
DATED : January 10, 2006  
INVENTOR(S) : Herve Tricaud Page 2 of 7

Figure 7:
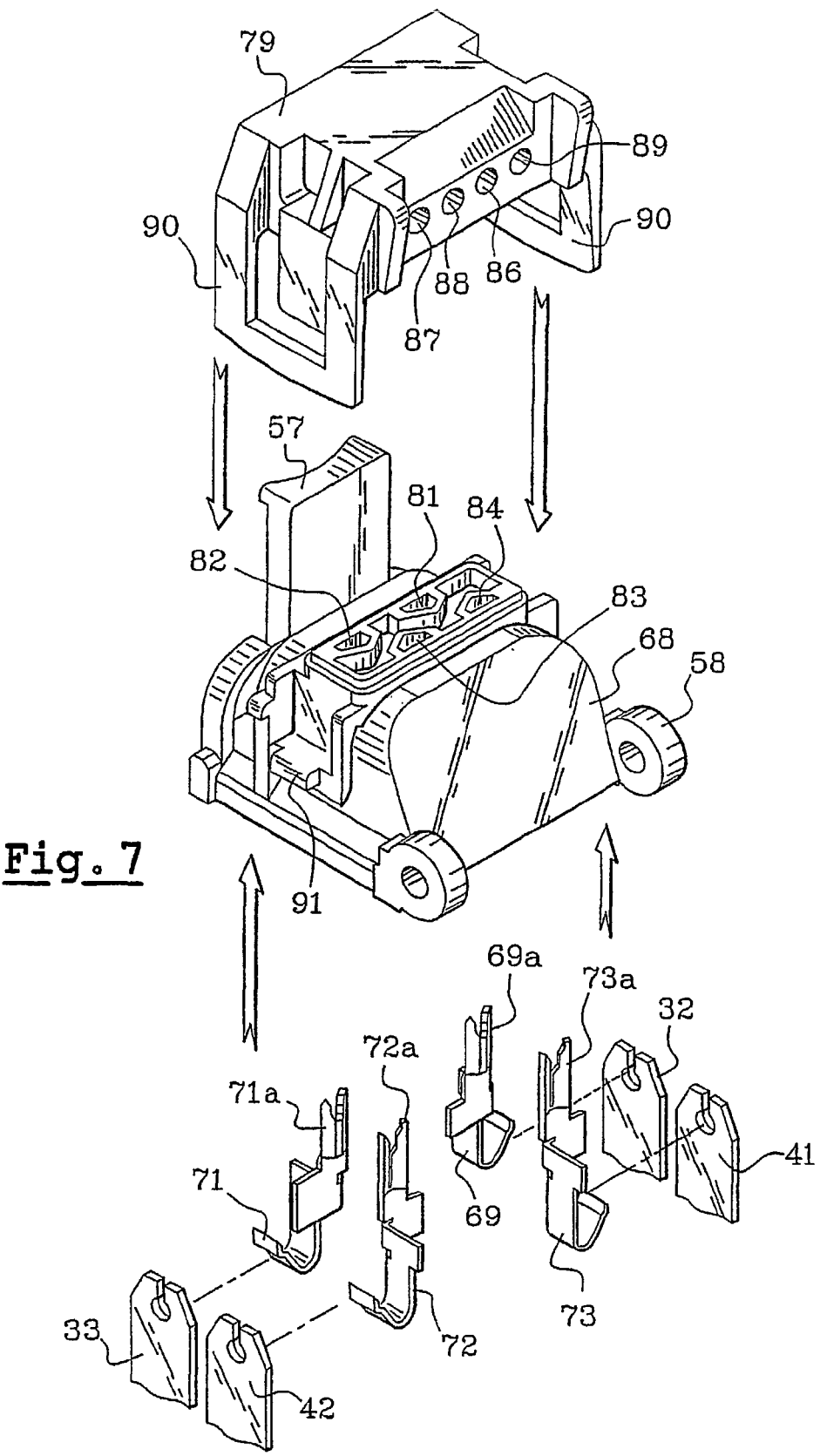
FIG. 7 shows in exploded perspective view a cover according to a second embodiment of the invention.
Figure 8:
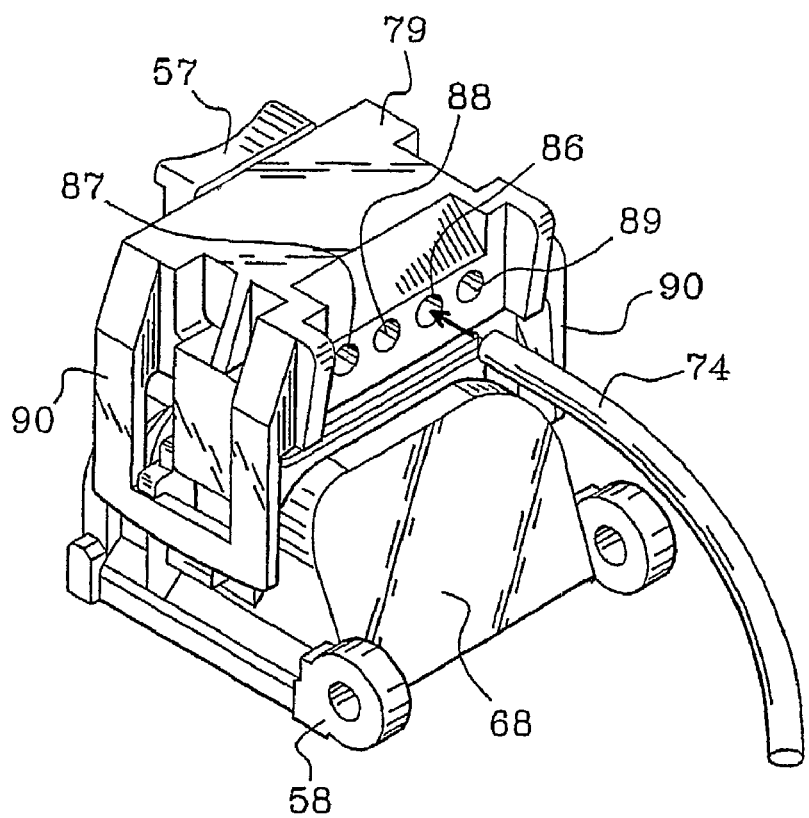
FIG. 8 shows in perspective view the cover of FIG. 7 ready to receive four wires for connection with an additional electrical member.
Figure 9:
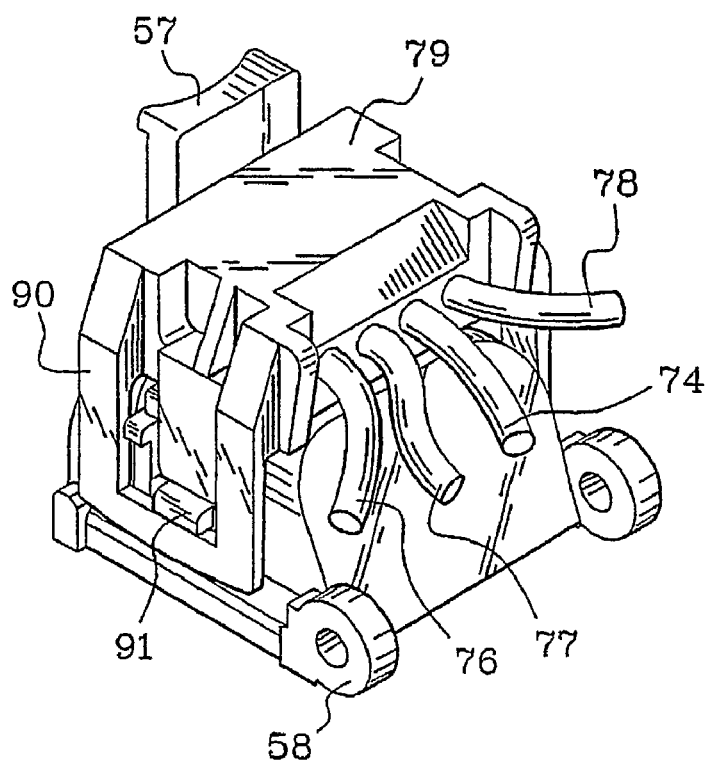
FIG. 9 shows in perspective view the cover of FIG. 7 provided with four wires for connection with an additional electrical member.
Figure 10:
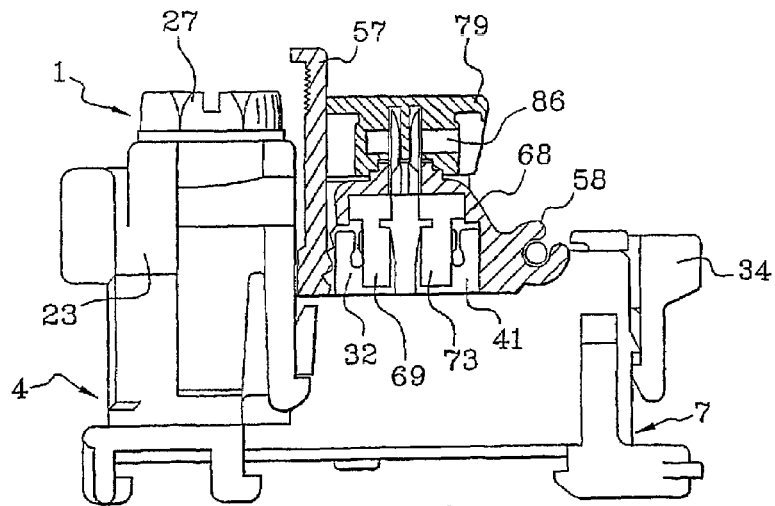
FIG. 10 shows a side view, with parts torn away and with longitudinal section of the cover, of an interconnection module equipped with the cover of FIG. 7.
Figure 11:
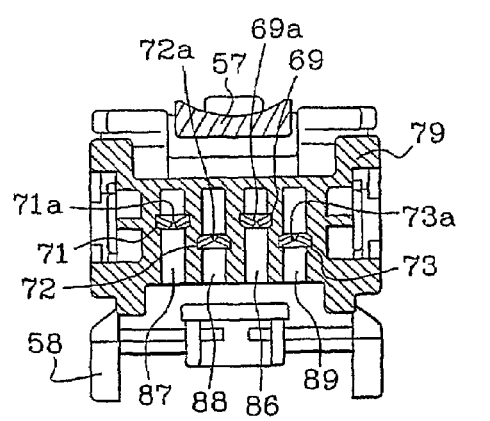
FIG. 11 shows a plan view in horizontal section of the cover of FIG. 7.
Figure 12:
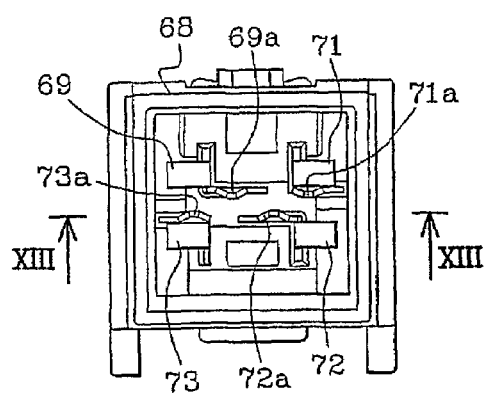
FIG. 12 shows a view from underneath, by transparency, of the cover of FIG. 7.
Figure 13:
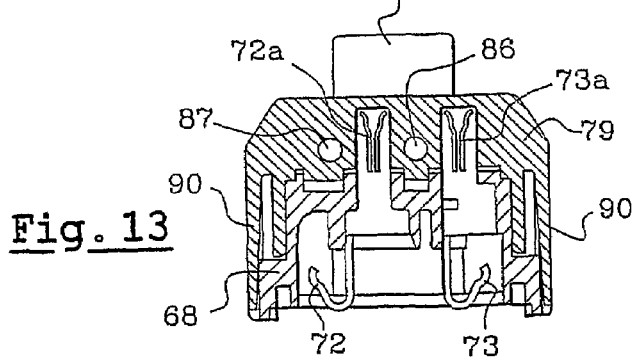
FIG. 13 shows a cross section of the cover along the plane XIII—XIII in FIG. 12.

It is certified that error appears in the above-identified patent and that said Letters Patent is hereby corrected as shown below:

Drawing  
Sheet 4/11, Fig. 7

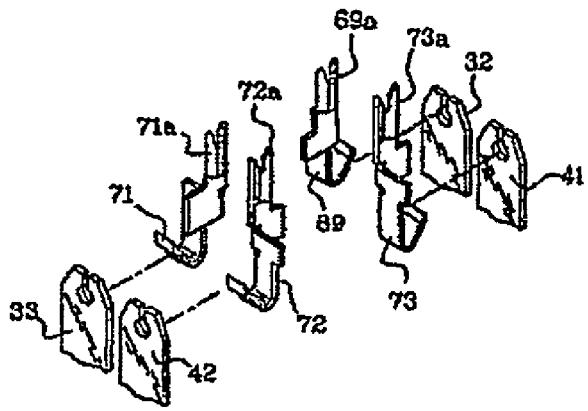

Delete " " and

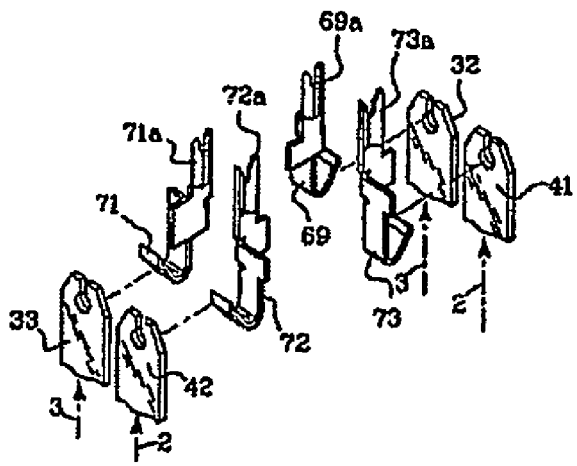

insert -- --, therefor.

UNITED STATES PATENT AND TRADEMARK OFFICE
CERTIFICATE OF CORRECTION

Figure 14:
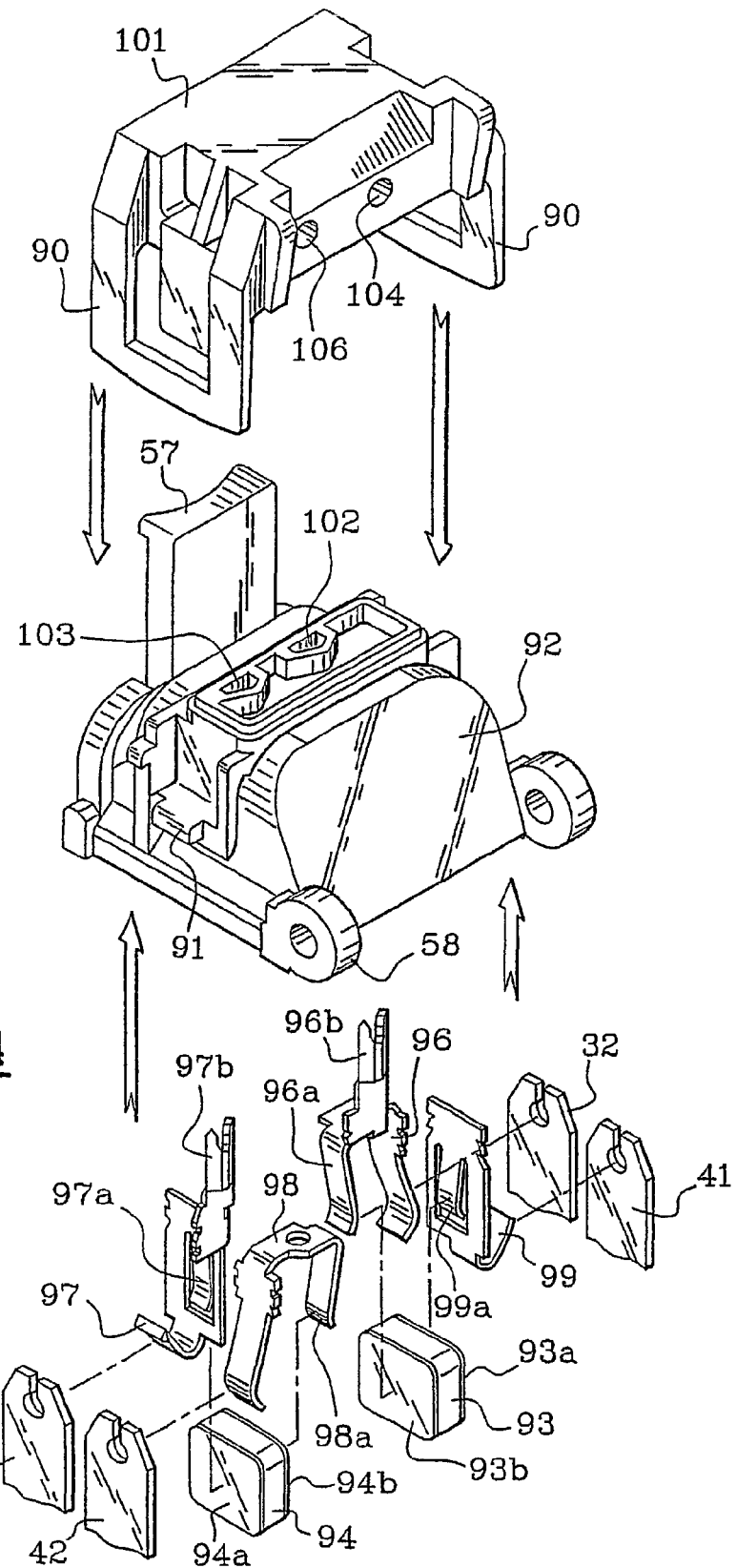
FIG. 14 shows in exploded perspective view a cover and its contacts according to a third embodiment of the invention.

PATENT NO. : 6,984,147 B2  Page 3 of 7
APPLICATION NO. : 10/281630
DATED : January 10, 2006
INVENTOR(S) : Herve Tricaud It is certified that error appears in the above-identified patent and that said Letters Patent is hereby corrected as shown below:

Drawing
Sheet 7/11, Fig. 14

Delete " 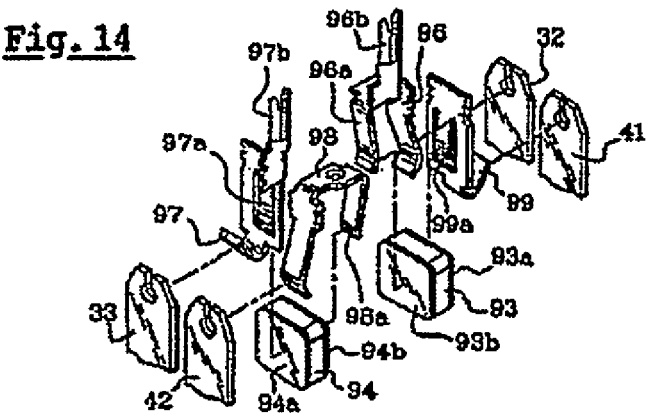 " and insert -- 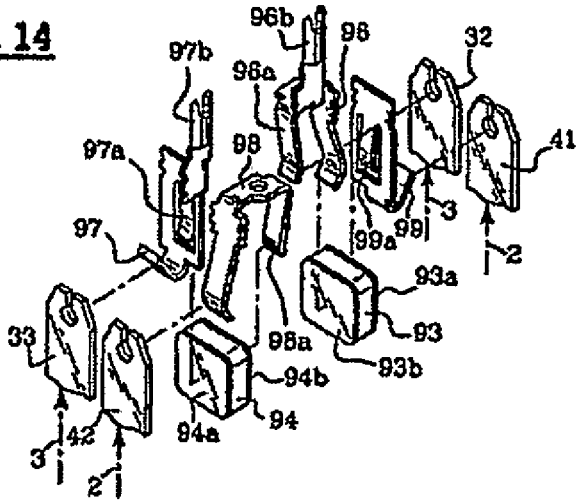 --, therefor.

UNITED STATES PATENT AND TRADEMARK OFFICE
CERTIFICATE OF CORRECTION

Figure 15:
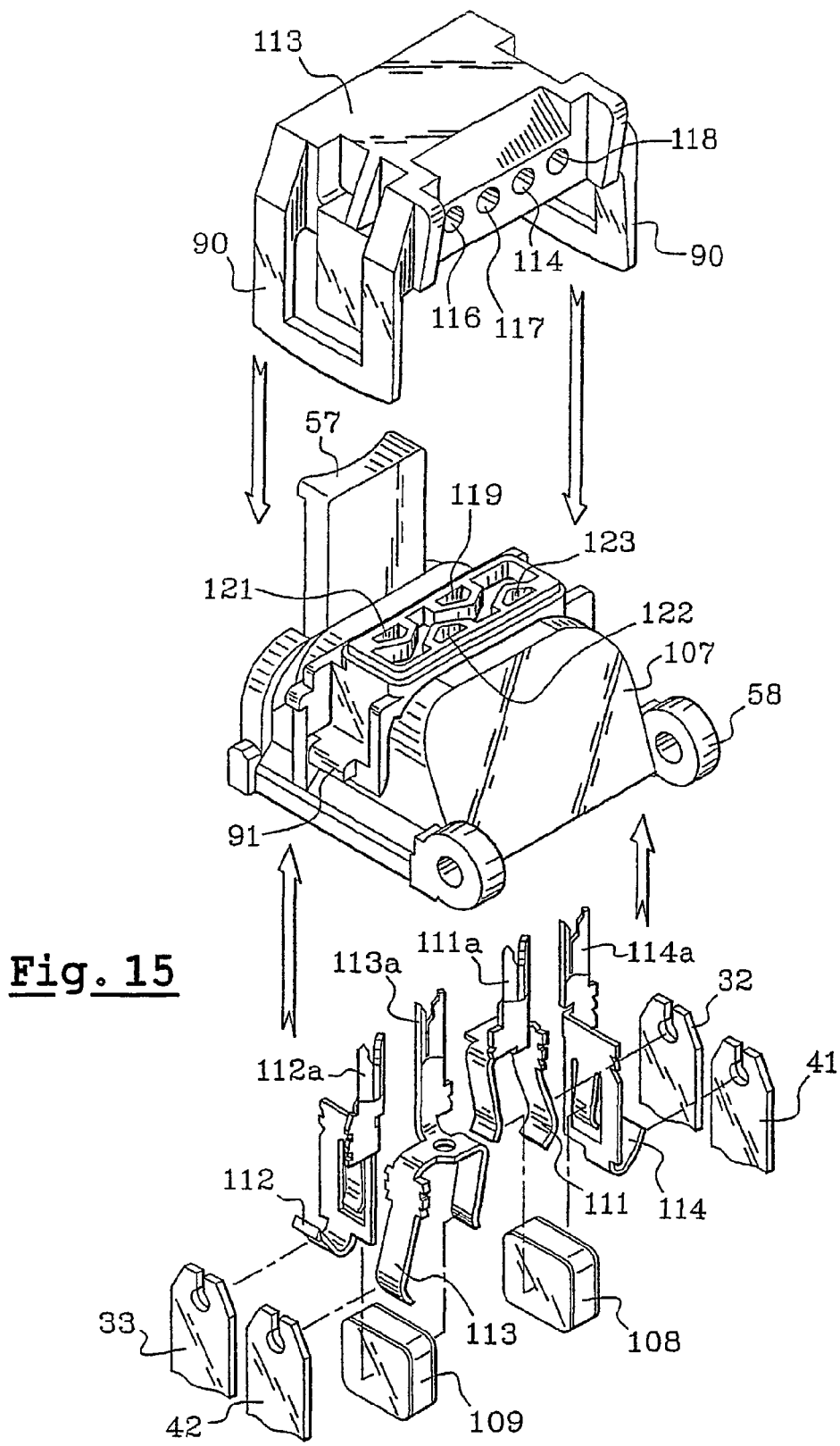
FIG. 15 shows in exploded perspective view a cover and its contacts according to a fourth embodiment of the invention.
Figure 18:
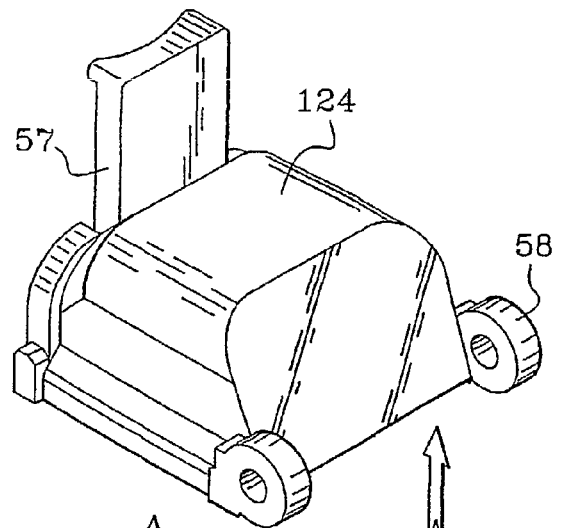
FIG. 18 shows a cross section of the cover along the plane XVIII—XVIII in FIG. 17.
Figure 18:
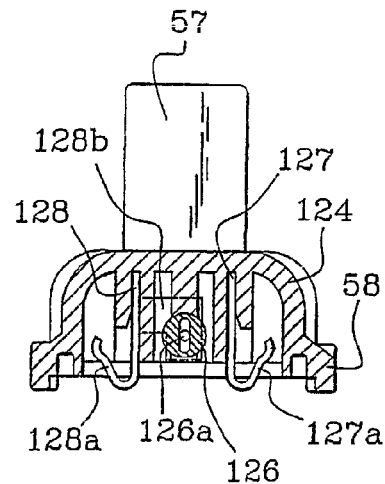

PATENT NO. : 6,984,147 B2
APPLICATION NO. : 10/281630
DATED : January 10, 2006
INVENTOR(S) : Herve Tricaud It is certified that error appears in the above-identified patent and that said Letters Patent is hereby corrected as shown below:

Drawing
Sheet 8/11, Fig. 15

Delete " 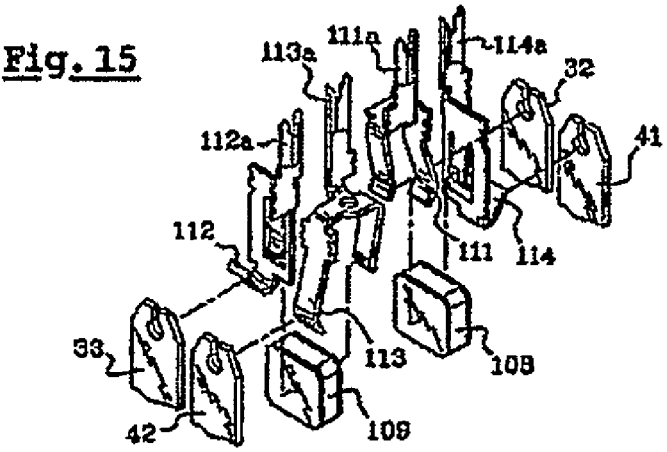 " and insert -- 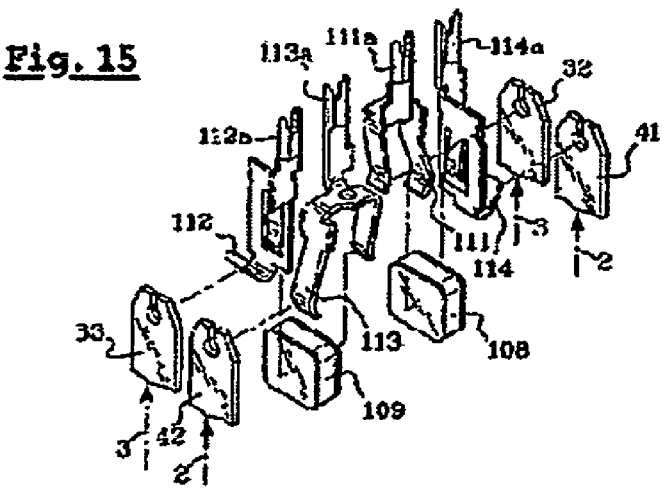 --, therefor.

UNITED STATES PATENT AND TRADEMARK OFFICE
CERTIFICATE OF CORRECTION

Figure 16:
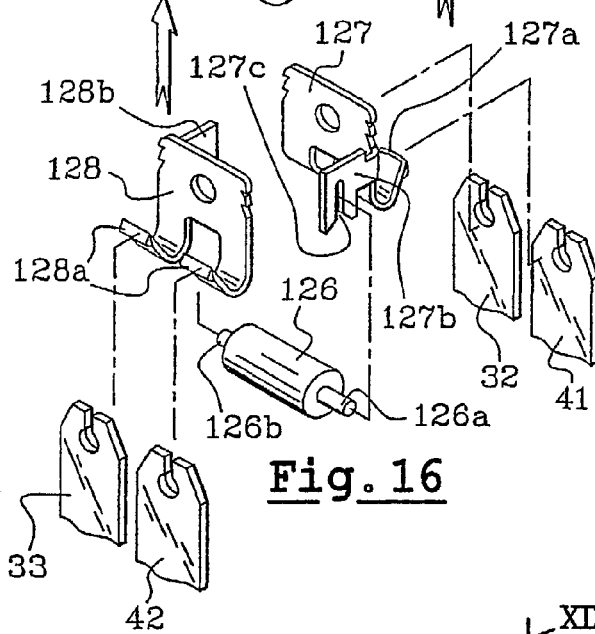
FIG. 16 shows in exploded perspective view a cover according to a fifth embodiment of the invention.
Figure 19:
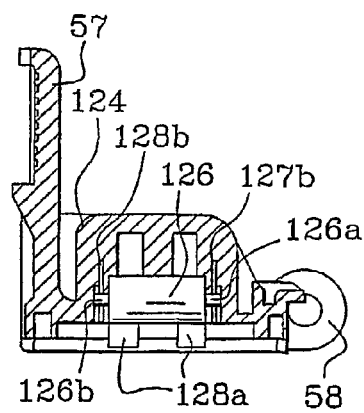
FIG. 19 shows a longitudinal section of the cover along the plane XIX—XIX in FIG. 17.
Figure 17:
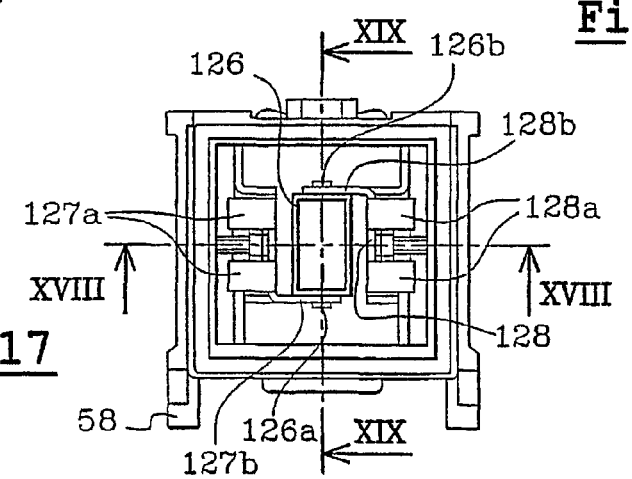
FIG. 17 shows a view from underneath of the cover of FIG. 16.

PATENT NO. : 6,984,147 B2 Page 5 of 7
APPLICATION NO. : 10/281630
DATED : January 10, 2006
INVENTOR(S) : Herve Tricaud It is certified that error appears in the above-identified patent and that said Letters Patent is hereby corrected as shown below:

Drawing
Sheet 9/11, Fig. 16

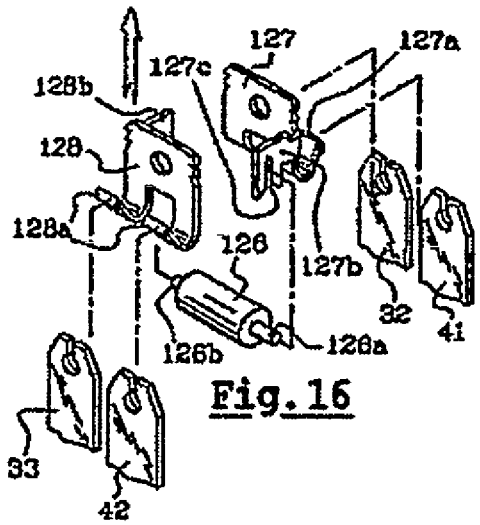

Delete " " and

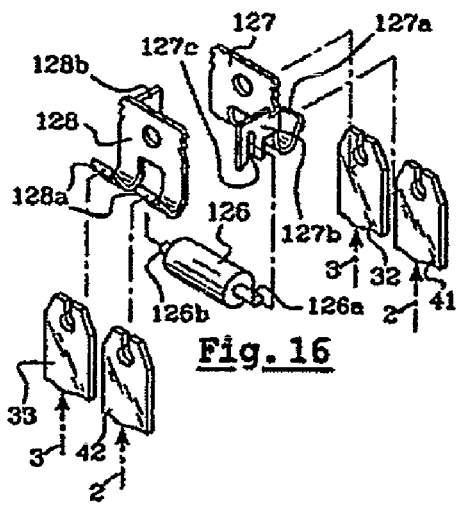

insert -- --, therefor.

UNITED STATES PATENT AND TRADEMARK OFFICE
CERTIFICATE OF CORRECTION

PATENT NO. : 6,984,147 B2
APPLICATION NO. : 10/281630
DATED : January 10, 2006
INVENTOR(S) : Herve Tricaud Page 6 of 7

Figure 20:
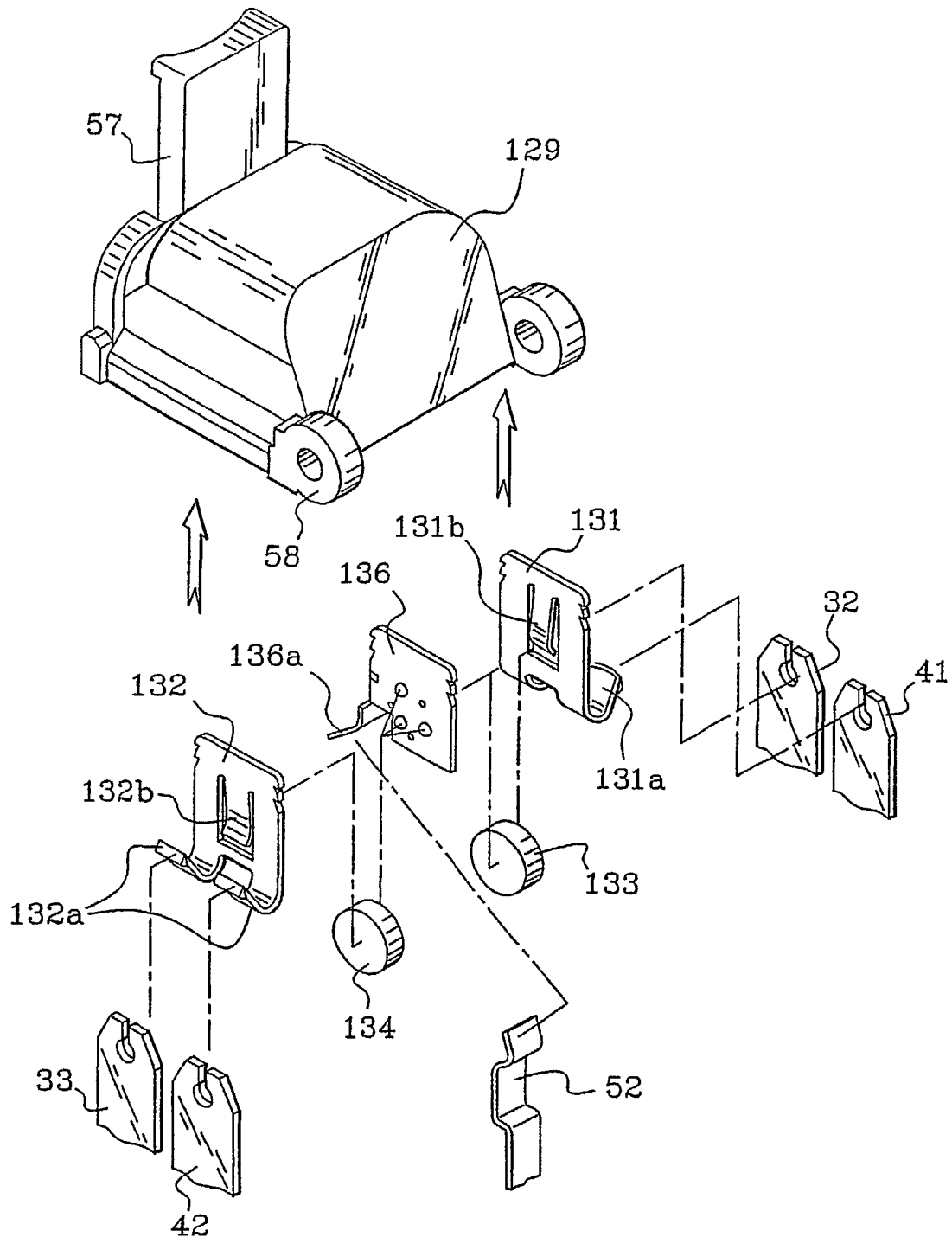
FIG. 20 shows in exploded perspective view a cover according to a sixth embodiment of the invention.
Figure 21:
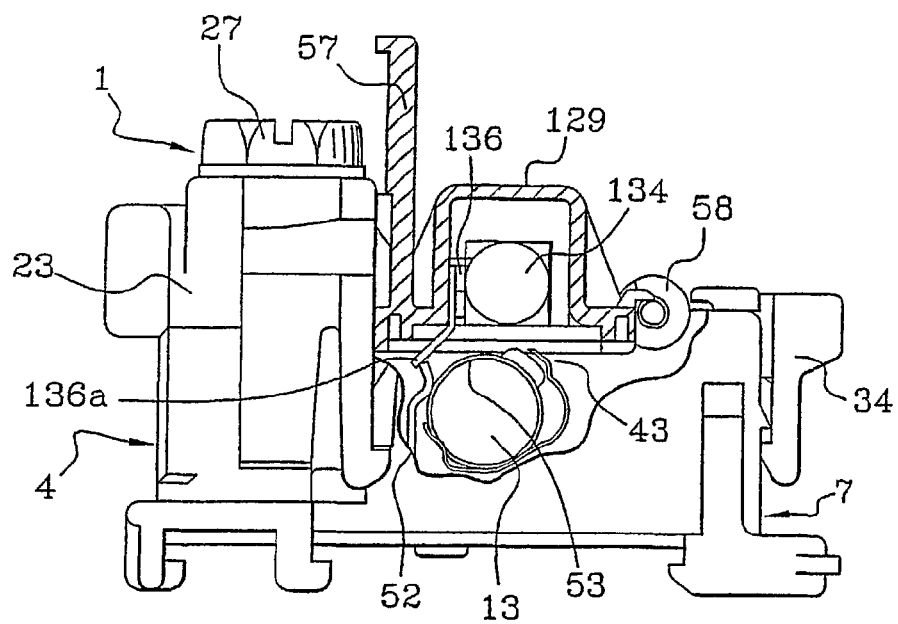
FIG. 21 shows a side view with parts torn away and with longitudinal section of the cover, of an interconnection module equipped with the cover of FIG. 20.
Figure 22:
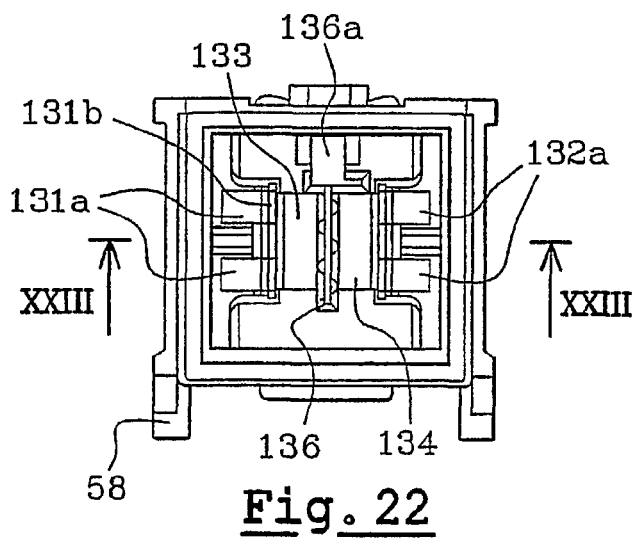
FIG. 22 shows a view from underneath of the cover of FIG. 20.
Figure 23:
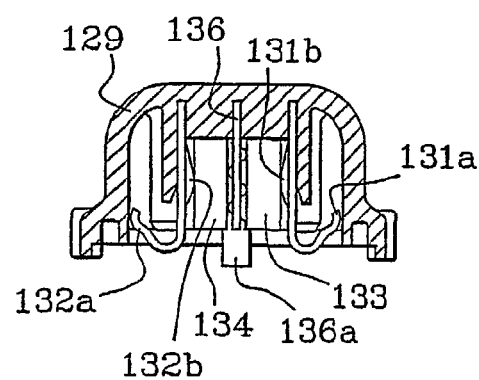
FIG. 23 shows a cross section of the cover along the plane XXIII—XXIII in FIG. 22.

It is certified that error appears in the above-identified patent and that said Letters Patent is hereby corrected as shown below:

Drawing
Sheet 10/11, Fig. 20

Delete " 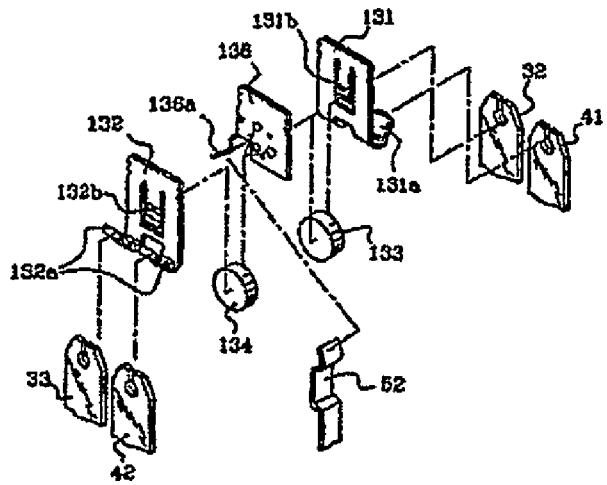 " and insert -- 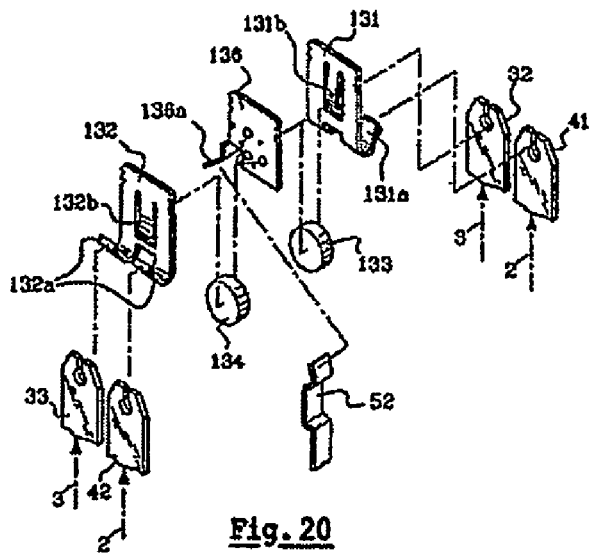 --, therefor.

UNITED STATES PATENT AND TRADEMARK OFFICE
CERTIFICATE OF CORRECTION

PATENT NO.       : 6,984,147 B2
APPLICATION NO.  : 10/281630
DATED            : January 10, 2006
INVENTOR(S)      : Herve Tricaud It is certified that error appears in the above-identified patent and that said Letters Patent is hereby corrected as shown below:

Column 4
Line 50, after "overhead" delete "10".
Line 60, delete "formes" and insert -- forms --, therefor.

Column 5
Line 57, delete "cutoff" and insert -- cut-off --, therefor.

Column 12
Line 2, after "device" delete ",".
Line 13, delete "coupled" and insert -- couple --, therefor
Line 20, delete "coupled and said second coupled" and insert -- couple and said second couple --, therefor
Line 31, after "claim 2" delete ",".
Line 40, delete "contact," and insert -- contacts, --, therefor.
Line 49, delete "outgoing" and insert -- incoming --, therefor.

Signed and Sealed this

Fifth Day of December, 2006

JON W. DUDAS
*Director of the United States Patent and Trademark Office*